United States Patent
Druant et al.

(10) Patent No.: US 11,942,825 B2
(45) Date of Patent: Mar. 26, 2024

(54) COOLING SYSTEM FOR AN ELECTRIC MACHINE

(71) Applicant: Dana Automotive Systems Group, LLC, Maumee, OH (US)

(72) Inventors: Joachim Druant, Houthulst (BE); Steven Vanhee, Hooglede (BE); Thibault Devreese, Ghent (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 166 days.

(21) Appl. No.: 17/574,471

(22) Filed: Jan. 12, 2022

(65) Prior Publication Data
US 2023/0223801 A1 Jul. 13, 2023

(51) Int. Cl.
| | |
|---|---|
| H02K 1/20 | (2006.01) |
| H02K 5/20 | (2006.01) |
| H02K 9/19 | (2006.01) |
| H02K 11/33 | (2016.01) |

(52) U.S. Cl.
CPC .............. *H02K 1/20* (2013.01); *H02K 5/203* (2021.01); *H02K 9/19* (2013.01); *H02K 11/33* (2016.01)

(58) Field of Classification Search
CPC .......... H02K 9/227; H02K 11/33; H02K 9/19; H02K 5/203; H02K 1/20; H02K 5/20; H02K 9/00; H02K 9/02; H02K 9/04; H02K 9/06; H02K 9/08; H02K 9/10; H02K 9/12; H02K 9/14; H02K 9/16; H02K 9/18; H02K 11/30; H02K 1/32

USPC ....... 310/68 R, 52, 54, 55, 57, 58, 59, 60 R, 310/60 A, 64

See application file for complete search history.

(56) References Cited

U.S. PATENT DOCUMENTS

| | | | |
|---|---|---|---|
| 5,331,239 A | 7/1994 | Kwun et al. | |
| 5,491,370 A | 2/1996 | Schneider et al. | |
| 8,492,952 B2 | 7/2013 | Bradfield | |
| 8,970,074 B2 | 3/2015 | Wagner et al. | |
| 9,881,019 B2 | 1/2018 | Matsuo | |
| 10,396,627 B2 | 8/2019 | Owen | |
| 2004/0090130 A1* | 5/2004 | Kaneko .................. | H02K 11/33 310/58 |
| 2013/0285485 A1 | 10/2013 | Song et al. | |
| 2014/0197701 A1 | 7/2014 | Hossain et al. | |
| 2014/0292163 A1* | 10/2014 | Lau ........................ | H02K 9/223 310/60 R |
| 2015/0199376 A1 | 7/2015 | Matsuo | |
| 2015/0280525 A1* | 10/2015 | Rippel ..................... | H02K 9/24 310/54 |
| 2017/0294821 A1* | 10/2017 | Shimizu ................. | H02K 9/227 |
| 2018/0054095 A1* | 2/2018 | Dlala ....................... | H02K 1/16 |
| 2018/0123409 A1* | 5/2018 | Rogginger ............. | B02C 23/00 |
| 2019/0003572 A1 | 1/2019 | Dellal et al. | |
| 2020/0204044 A1 | 6/2020 | Lee et al. | |
| 2021/0075274 A1 | 3/2021 | Druant et al. | |

\* cited by examiner

*Primary Examiner* — Alexander A Singh
(74) *Attorney, Agent, or Firm* — McCoy Russell LLP

(57) ABSTRACT

Systems and methods for cooling an electric motor in an electric drive unit are provided. In one example, the electric motor includes a stator and an inverter power module positioned within a motor housing. The inverter power module forms an interface with a peripheral surface of an outer section of stator laminations of the stator, and the stator laminations include a plurality of cutouts forming axially extending oil ducts.

17 Claims, 4 Drawing Sheets

COOLING SYSTEM FOR AN ELECTRIC MACHINE

TECHNICAL FIELD

The present description relates generally to systems and methods for cooling an electric machine and a power module.

BACKGROUND AND SUMMARY

Previous motors, particularly traction motors in electric vehicles, have used cooling systems to reduce the motor's operating temperature. Certain prior motors have made use of water jackets that surround an outer housing and circulate water around the housing for heat removal. Other previous motors have used oil cooling systems which route oil channels routed through the stator for cooling. The oil channels, in certain motors, may not provide a desired amount of cooling to components surrounding the stator while some water jacket designs may not provide a targeted amount of cooling for the stator. Further, other previous systems have made attempts to provide cooling to inverters that are spaced apart from the motor unit using cooling plates. Using cooling plates for inverter cooling may increase the complexity and weight of the motor assembly.

U.S. Pat. No. 9,881,019 B2 to Matsuo discloses an electric motor provided with a coolant jacket which is formed in a housing thereof. Matsuo also discloses an inverter unit module mounted on top of the motor housing. The inverter unit includes a heat sink plate that absorbs heat produced by a power module, and coolant in the coolant jacket is directed through heat plate fins.

The inventors have recognized several issues with Matsuo's cooling system as well as other previous cooling systems. For instance, the separate enclosures for the motor and inverter components provide a bulky housing assembly, which may pose packaging difficulties in certain space-constrained electric drive arrangements. Further, Matsuo's cooling system does not directly cool the stator or the inverter module, but rather relies on heat transfer through walls of the housing and the heat sink plates. Consequently, Matsuo's cooling system design may not provide a desired amount of cooling in certain motors such as motors with relatively high operating speeds. Thus, the inventors have recognized a desire for a more effective and space-efficient cooling system for an electric motor and inverter assembly.

To resolve at least some of the aforementioned issues, the inventors have developed an electric machine that includes a stator formed as a stack of stator laminations. Each of the stator laminations has multiple cutouts that form oil ducts that axially extend through the stack of stator laminations. The electric motor further includes an inverter power module that forms an interface with a peripheral surface of an outer section of the stack of stator laminations. The stator and the inverter power module are positioned within a housing of the electric machine. By flowing oil through the stator laminations and providing the inverter module adjacent to stator stack's peripheral surface, the oil may be efficiently used to cool both the inverter power module and the stator. Further, by utilizing a common housing for the power module and stator, the motor's cooling arrangement and overall system may exhibit greater compactness than previous motors and cooling systems and may consequently be easier to incorporate into an electric drive system, if so desired. Even further, by cooling the power module using the oil channel an inverter cooling plate or additional cooling arrangements can be omitted from the machine, if wanted. Consequently, the overall complexity, weight, and in some cases cost of the cooling system may be reduced.

In one example, to enhance cooling of the inverter power module, the interface may include a thermal interface material, such as a thermal paste, arranged between the peripheral surface of the stack of stator laminations and the inverter power module. In this way, a greater amount of heat may be conducted from the inverter power module to the oil via the stator laminations. Consequently, the cooling system's performance is space efficiently increased.

In yet another example, the stator cutouts may be located radially outward from teeth in the stator laminations. Arranging the cutouts in this manner prevent the oil channels from interfering with the design of the stator teeth and associated winding while also providing greater cooling to the stator than electric machines using water jackets, for instance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-4 are drawn approximately to scale. However, other relative component dimensions may be used, in alternate embodiments.

DETAILED DESCRIPTION

The following description relates to a cooling system that space efficiently and effectively cools a stator and inverter power packs of an electric machine. This effective cooling arrangement is achieved by routing oil through channels in the stator that are near a periphery of a stator lamination stack, where the inverter power packs are attached (e.g., directly coupled) at the periphery. In this way, the oil channels serve a dual-use cooling functionality. Consequently, both the stator lamination stack and the inverter power packs can be efficiently cooled.

Figure 1:
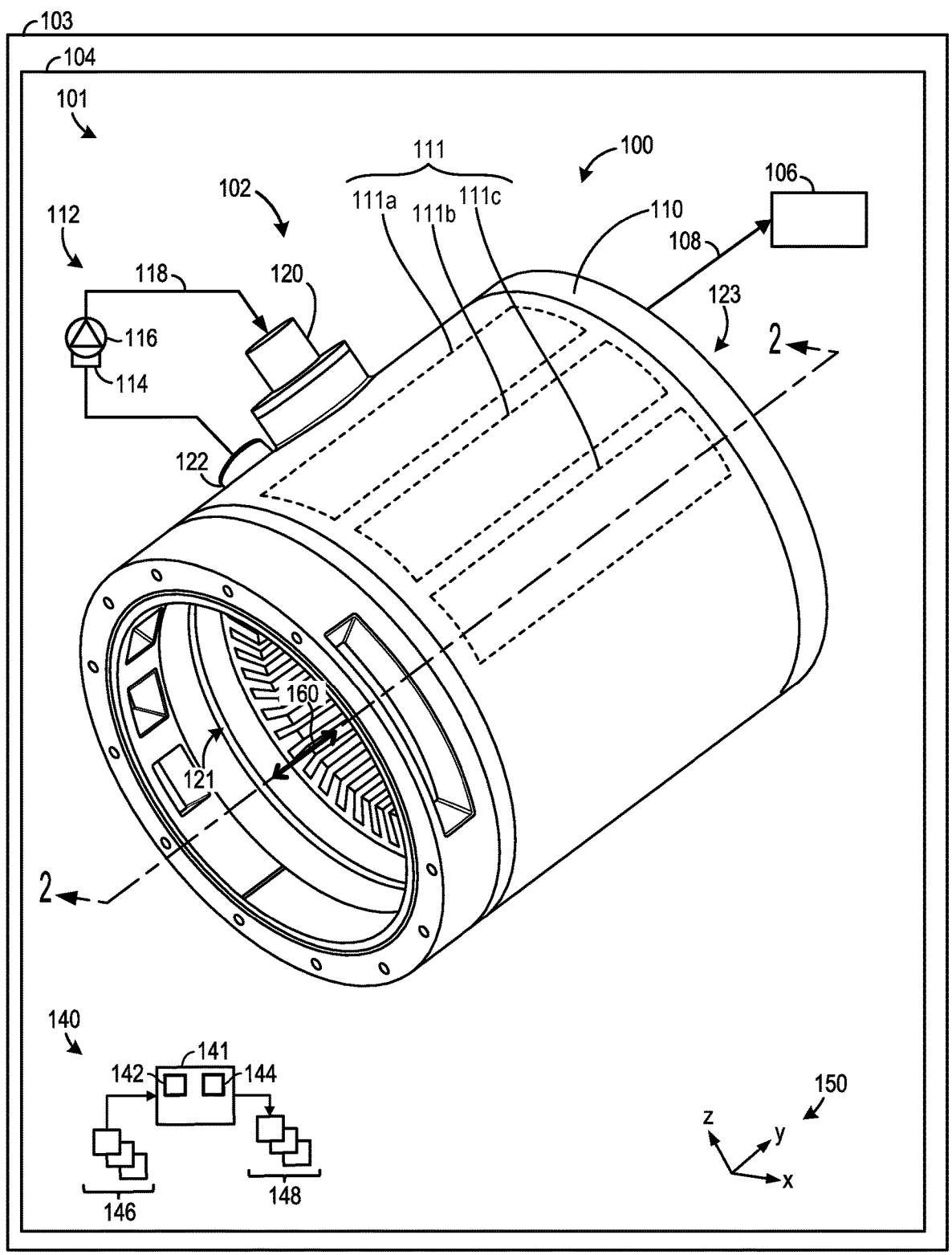
FIG. 1 shows an electric motor with a cooling system.
Figure 2:
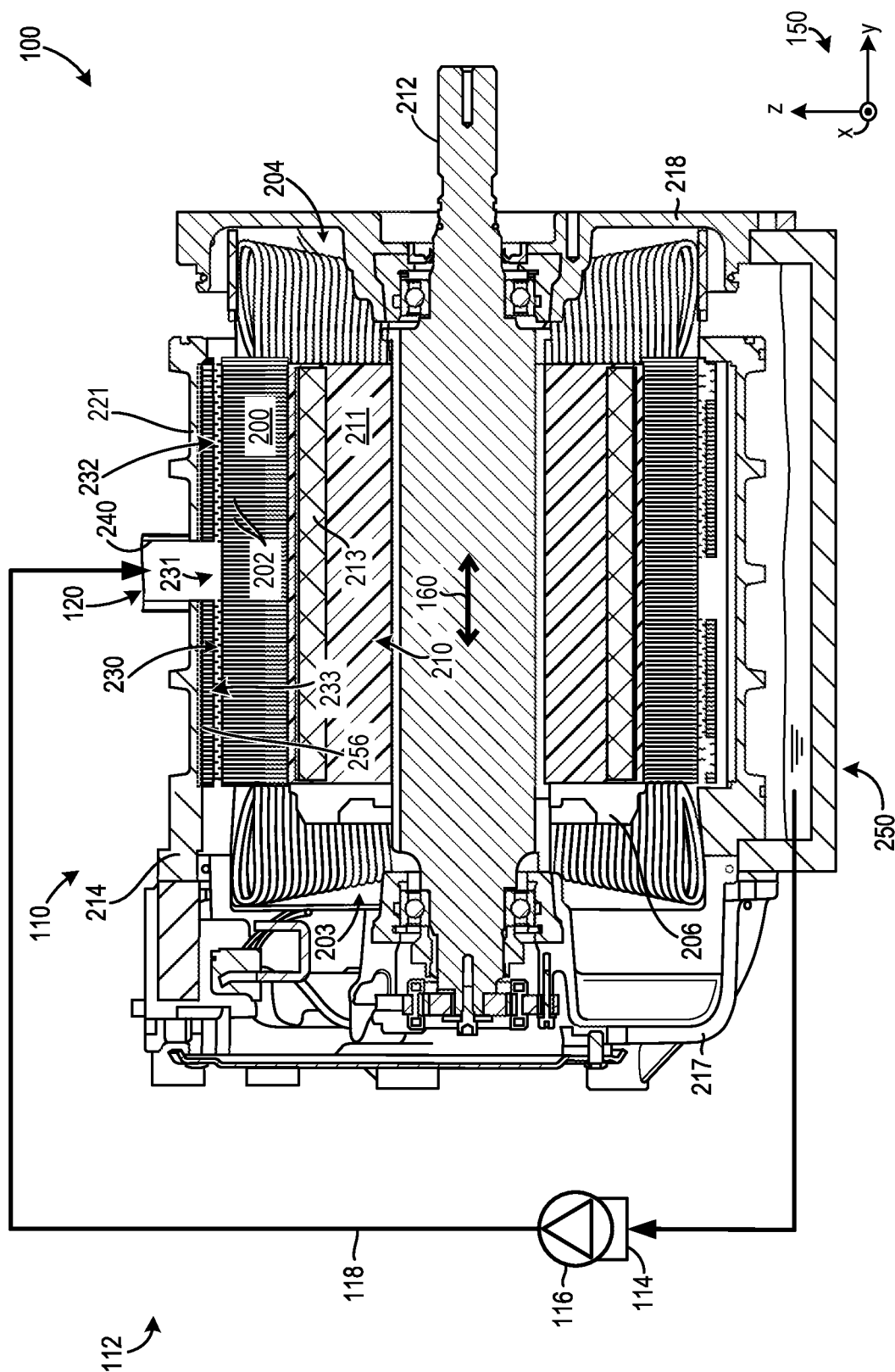
FIG. 2 shows a cross-sectional view of the electric motor depicted in FIG. 1.
Figure 3:
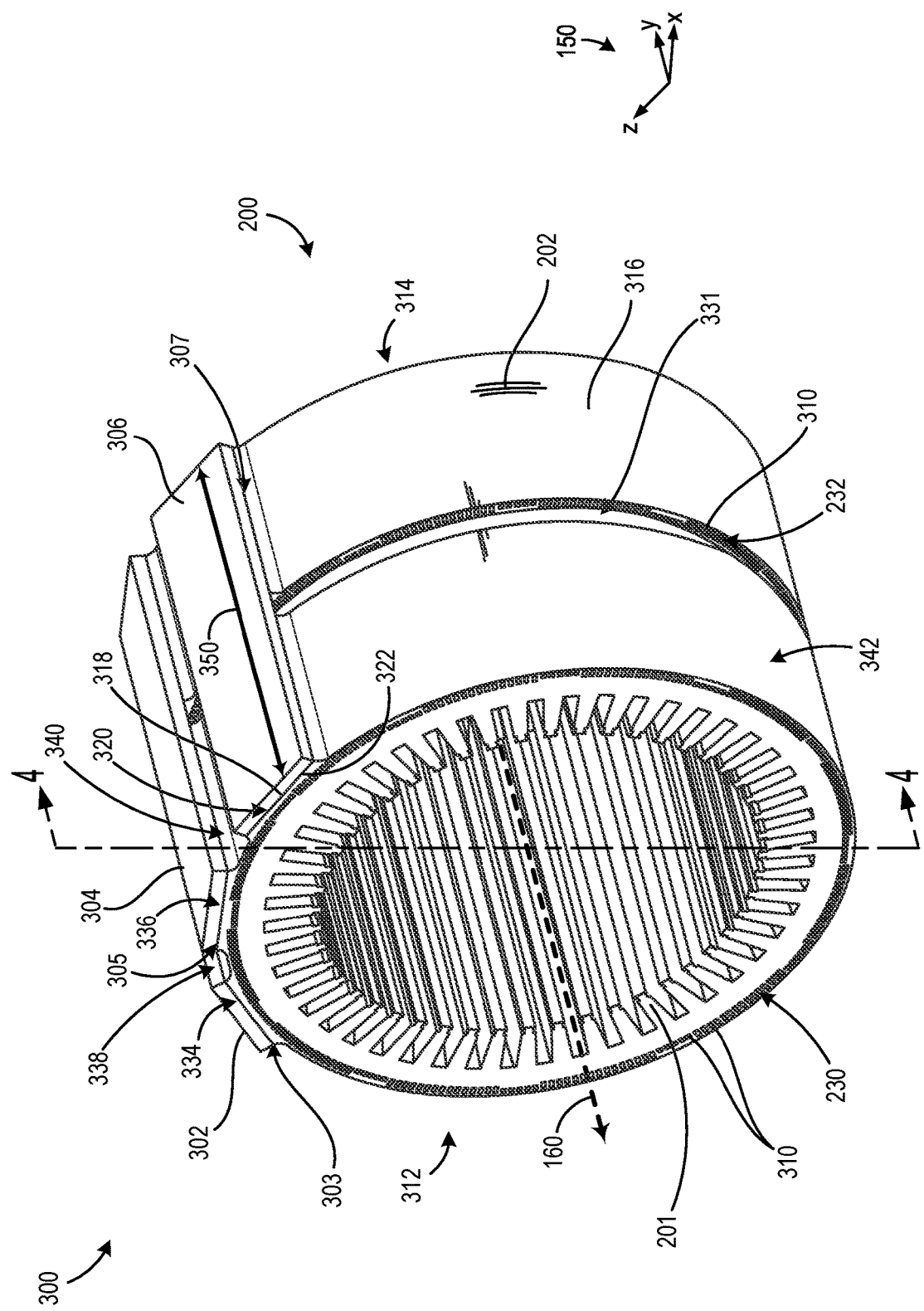
FIG. 3 shows a portion of the electric motor shown in FIGS. 1-2, particularly illustrating a stator core with inverter power modules coupled thereto.
Figure 4:
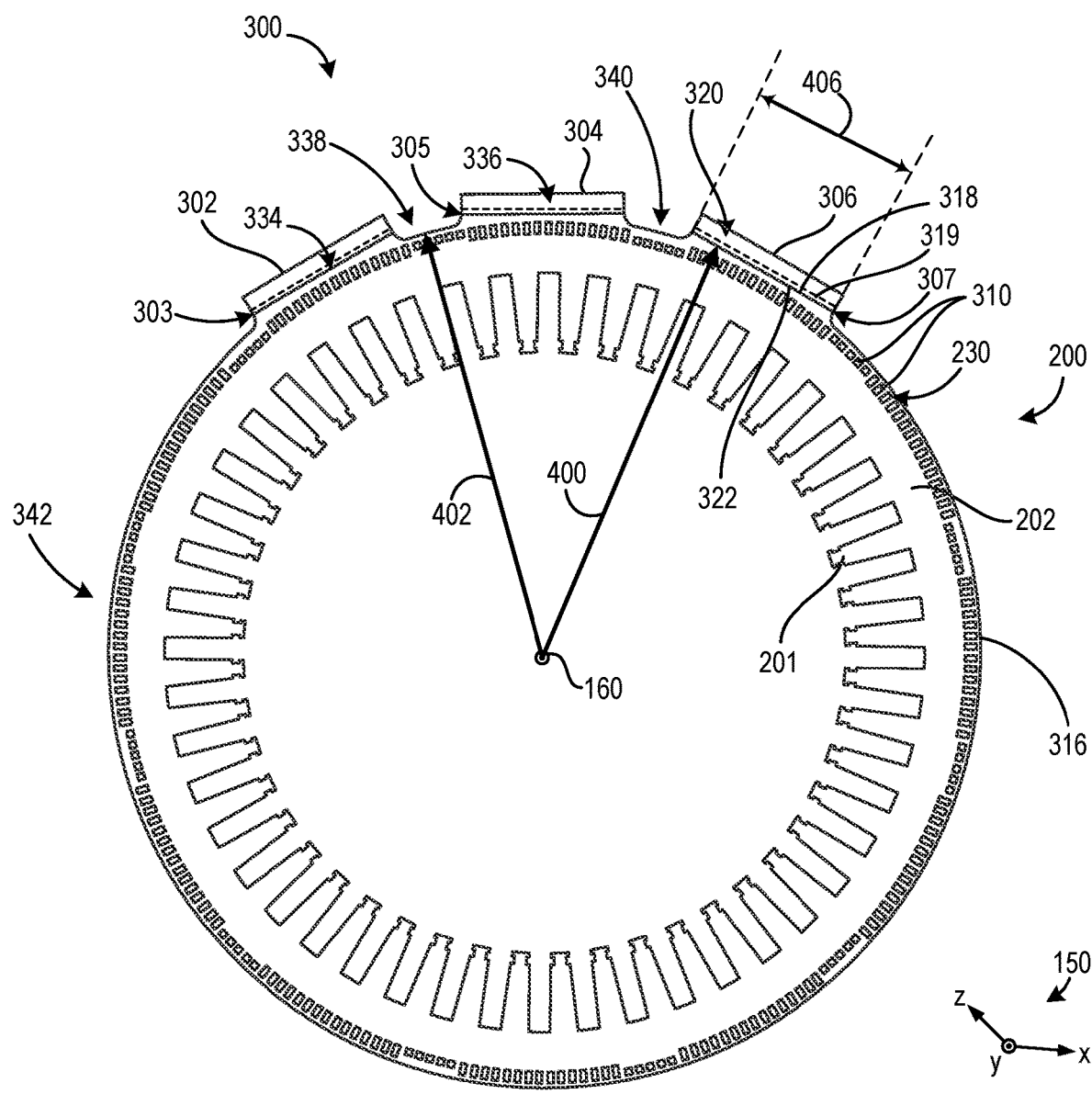
FIG. 4 shows an axial view of the stator core and inverter power modules depicted in FIG. 3.

FIG. 1 schematically illustrates a cooling system for an electric machine. FIG. 2 shows a cross-sectional view of the electric machine and cooling system formed in a housing thereof. FIGS. 3 and 4 show different views of a stator core and inverter power modules that may be enclosed in the housing of the electric machine shown in FIGS. 1-2.

FIG. 1 illustrates an electric drive unit 101 with an electric machine 100 (e.g., an electric motor or motor-generator). FIG. 1 further schematically depicts a cooling system 102 for the electric machine. In one particular example, the electric machine 100 includes at least one inverter power module cooled by the cooling system 102, as will be elaborated on herein, particularly with regard to FIGS. 2-4.

The electric drive unit 101 may additionally include a gearbox and/or other suitable components. The electric drive unit 101 and cooling system 102 may reside in a transmission system 104 of a vehicle 103 or other suitable system. In such examples, the vehicle may take a variety of forms in different embodiments, such as a light, medium, or heavy duty vehicle. Alternatively, the electric machine may be used in other suitable systems, such as systems in manufacturing facilities or other industrial settings.

In some examples, in addition to the electric machine 100 in the transmission system 104, the vehicle 103 may further include another motive power source, such as an internal combustion engine (ICE) (e.g., a spark and/or compression ignition engine) or other suitable devices designed to generate rotational energy. The internal combustion engine may include conventional components such as cylinders, pistons, valves, a fuel delivery system, an intake system, an exhaust system, and the like. Further, the electric machine 100 may include components for generating mechanical power as well as electric power during a regeneration mode, in some cases, such as a stator, a rotor, and the like enclosed within a housing 110. Thus, the transmission system 104 and electric machine 100 may be utilized in a hybrid or battery electric vehicle.

In one particular example, the electric drive unit 101 includes one or more inverter power modules positioned within the housing 110 of the electric machine 100 along with the stator and rotor. Specifically, the housing 110 may enclose inverter the power modules 302, 304, and 306 arranged with a stator 200, shown in FIGS. 3-4 as a stator and inverter power module assembly 300. The specific structures of the stator, rotor, and inverter power modules will be further described herein with respect to FIGS. 2-4. The housing 110 may therefore be structured to accommodate the one or more inverter power module(s) at housing portions 111, as illustrated via dashed boxes. The inverter power module(s) may be electrically connected to a DC voltage source (e.g., one or more batteries in a battery pack) and designed to convert electrical energy supplied from the DC voltage source to AC power used to power the electric machine 100. In one example, the one or more inverter power modules may include multiple modules which may be positioned in the housing 110 at housing portions 111a, 111b and 111c for providing 3-phase AC power to the electric machine 100.

Further, in some examples, the inverter power module(s) may have a generally rectangular shape and extend axially along a portion of the electric machine 100, specifically positioned along a peripheral surface of a stator of the electric machine, as will be discussed in greater detail herein with respect to FIGS. 2-4. Accordingly, the housing portions 111 of the housing 110 may have a generally rectangular profile and may protrude radially outward to an extent corresponding to the volume of the inverter power module(s), in one example. When three inverter power modules are included in the housing 110, three distinct housing portions 111a, 111b, and 111c may protrude outwardly from the housing for enclosing each of the modules. Alternatively, the housing portions 111a-111c where the three inverter power modules are enclosed may be included in a single section of the housing 110 that protrudes radially outward along a portion of the circumference of the housing. In other examples, however, the housing 110 may have a general smooth surface at housing portions 111, where spaces for accommodating the inverter power modules are provided within the housing. However, in other examples, the system may include a different number of modules, such as more than three modules or less than three modules.

By enclosing or otherwise incorporating the inverter power modules (e.g., modules 302, 304, 306, as depicted in FIGS. 3-4) into the housing 110 of the electric machine 100, the electric machine can be provided as a compact, space-efficient package. Further, the complexity of electrical connections between the electric machine and the inverter power modules may be reduced, and the cooling system 102 may be used to effectively and efficiently remove heat from both the components of the electric machine and the inverter power modules, as will be elaborated on herein. The specific structures of the inverter power modules as well as the other components of the electric machine 100 and cooling system 102 will be described in detail herein with respect to FIGS. 2-4.

In some examples, the electric machine 100 may be designed to provide mechanical power to a downstream component 106 via an output shaft or other suitable mechanical component, represented by an arrow 108. The component 106 may be a transmission, a gearbox in an electric axle, a differential, and the like. Alternatively, the electric machine 100 may be used in equipment other than a vehicle. As such, the component 106 may be a pump, compressor, fan, and the like.

The cooling system 102 may include an oil circuit 112 designed for cooling the electric machine 100 and associated components, such as the inverter power module(s) mounted within the housing 110 (e.g., proximate housing portions 111), in one particular example.

The oil circuit 112 may include a filter 114 and an oil pump 116. The oil pump 116 flows oil (e.g., natural and/or synthetic oil) through an oil delivery line 118 and into the housing 110 via an oil inlet 120. In one example, the oil pump 116 may be designed to pick up oil from an oil sump which is formed within a lower portion of the housing 110 (e.g., oil sump 250 shown in FIG. 2), via an oil outlet 122. In some examples, the pump 116 and the filter 114 may be disposed external to the housing 110 and in fluid communication with the sump and the oil inlet 120 via oil lines. However, in other examples, the pump 116 and the filter 114 may be incorporated in the housing.

In some cases, the oil inlet 120 may be mounted to the housing 110 and extend therethrough, in order to direct oil in to the stator of the electric machine. In other examples, however, the oil inlet 120 may be integrally formed with the housing. In one example, the oil inlet 120 may be mounted to the housing 110 at an upper portion of the housing (e.g., such that an axial passage of the oil inlet is substantially aligned with a gravitational axis), so that oil entering the housing through the oil inlet may be distributed as desired, as will be described in detail herein with reference to FIG. 2, and routed by gravity into the oil sump.

The oil inlet 120 may be positioned at a central location with regard to an axial length of the housing 110, such as at or near a mid-point between a first axial side 121 and a second axial side 123 of the stator and rotor assembly of the electric machine 100. Arranging the oil inlet at or near the mid-point may enable the stator, and the one or more inverter power modules assembled with the stator, to be more evenly cooled. However, other arrangements of the oil inlet have been contemplated. For instance, the oil inlet 120 may be located along the housing at a position that is offset from the mid-point between the axial sides of the assembly and closer to one of the axial ends of the housing 110, in other examples.

A control system 140 with a controller 141 may further be included in the system 104. The controller may include a processor 142 and memory 144 with instructions stored therein that, when executed by the processor, cause the controller to perform various methods and control techniques described herein. The processor may include a microprocessor unit and/or other types of circuits. The memory may include known data storage mediums, such as random access memory, read only memory, keep alive memory, combinations thereof, and the like.

The controller 141 may receive various signals from sensors 146 positioned in the system 104 and the electric machine 100. Conversely, the controller 141 may send control signals to various actuators 148 at different locations in the system based on the sensor signals. For instance, the controller 141 may send command signals to the oil pump 116 and, in response, the actuator in the pump may be adjusted to alter the flowrate of the oil delivered therefrom. In other examples, the controller may send control signals to the electric machine 100 and, responsive to receiving the command signals, the motor may be adjusted to alter the motor speed. The other controllable components in the system, may be operated in a similar manner with regard to sensor signals and actuator adjustment.

An axis system 150 is provided in FIG. 1, as well as FIGS. 2-4, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows a cross-sectional view of the electric machine 100, as defined by a lateral cut taken along the dashed line 2-2 in FIG. 1, particularly illustrating the structure of the housing 110 as well as the components of the electric machine enclosed therein (e.g., the stator and rotor). Thus, the lateral cut plane may pass through a rotational axis 160 of the electric machine 100, illustrated in FIGS. 1-4, for reference. Further, FIGS. 3 and 4 show different views of the stator of the electric machine 100 and the inverter power modules coupled thereto, with the housing 110 removed and the rotor and other electric machine components omitted to reveal the machine's internal components. More specifically, FIG. 3 shows a perspective view of the stator and inverter power modules coupled thereto, and FIG. 4 shows a cross-sectional view of the stator and inverter power module assembly depicted in FIG. 3, as defined by a lateral cut taken along the dashed line 4-4 in FIG. 3. Structural aspects and details of the components of the electric machine 100 and the cooling system 102, such as oil channels (e.g., extending through the stator) of the oil circuit 112, are expanded upon accordingly.

FIG. 2 specifically shows the electric machine 100 including a stator 200 and a rotor 210 that are enclosed in the housing 110. The rotor 210 is positioned within the stator 200 and coaxial thereto. The stator 200 may include multiple stator laminations 202, formed as a stack of laminated plates, and multiple stator coils wound through the laminated stack to form end windings. For example, the end windings 203, 204, illustrated in FIG. 2, may be coiled around teeth 201 shown in FIGS. 3-4. Further, with continued reference to FIGS. 3-4, it will be understood that the end windings 203 and/or 204 of the stator coils may be coupled to one or more of inverter power modules 302, 304, 306 arranged on the stack of stator laminations 202. In this way, the inverter power modules 302, 304, 306 may provide appropriate excitation power (e.g., 3-phase AC power) to the stator coils to produce a rotating magnetic field in the stator 200, which then induces a magnetic force in the rotor 210 to produce torque in a rotor shaft 212. The proximity of the stator 200 and the inverter power modules 302, 304, 306 may provide for stable and reliable electrical coupling between the stator coils and the inverter power modules, if wanted. Details of the interface between the stator and the inverter power modules will be elaborated on further herein with reference to FIGS. 3 and 4.

Continuing with FIG. 2, the stator laminations 202 may be constructed out of steel (e.g., electrical steel, silicon steel, and the like). The housing 110 may be constructed out of a metal such as steel, aluminum, combinations thereof, and the like. In one particular example, the housing 110 may be constructed out of an aluminum alloy. In some examples, as previously discussed, the housing 110 may be shaped at certain portions (e.g., the housing portions 111 shown in FIG. 1) so as to accommodate the inverter power modules 302, 304, 306 (shown in FIGS. 3-4) in a space formed between the housing portion 214 and an outer peripheral surface of the stack of stator laminations 202.

In one example, the electric machine 100 may further include one or more balancing plates 206. Specifically, as illustrated in FIG. 2, the balancing plate 206 is positioned on one axial side of the rotor 210 (e.g., the rotor lamination stack). The balancing plate 206 may be attached to the rotor shaft 212 adjacent to the rotor. In some examples, another balancing plate may be positioned on an opposing axial side of the rotor, such that a rotor core 211 may be interposed between the balancing plates. Further, the balancing plate(s) may serve to fine tune the rotor's rotational mass balance and reduce the chance of imbalances that may decrease motor efficiency and/or lead to premature degradation of components thereof, in some cases. However, in other examples, the balancing plates may be omitted from the machine.

The rotor 210 may include a rotor core 211. In embodiments where the electric machine 100 is a permanent magnet AC motor, the rotor core 211 may include permanent magnets 213 that are embedded within rotor laminations of the rotor core 211. However, in other examples, the permanent magnets may be surface-mounted on the rotor laminations. As such, the electric machine 100 may be an interior permanent magnet machine or a surface-mounted permanent magnet machine, respectively, in different examples. Further, the rotor shaft 212 permits rotational energy to be transferred from the electric machine 100 to an external device (e.g., transmission, differential, and the like) or vice versa. Even further, covers 217 and 218 may be coupled to the housing 110 at opposing axial ends (e.g., via bolts, screws, and/or other suitable attachment devices), wherein at least one of the covers 218 may include an opening through which the rotor shaft 212 extends.

Further, the electric machine 100 utilizes the cooling system 102 to route oil, via the oil circuit 112, to jointly remove heat from the inverter power modules 302, 304, 306 and the stator 200 collectively enclosed within the housing 110 of the electric machine.

Continuing with FIG. 2, in order to effect direct stator cooling, the stator 200 may include one or more oil ducts 230, 232. The oil ducts extend through at least a portion of the stator laminations 202. The oil ducts 230, 232 may be formed in the stator laminations, by aligning (or partially aligning) openings (e.g., cutouts) formed in adjacent laminations in the stator laminations 202, so that when the stator laminations are pressed together, the opening(s) will form the oil ducts 230, 232 which may generally axially traverse the lamination stack.

Each of the stator laminations 202 may include at least one of these oil duct-forming openings. Specifically, each lamination may include multiple openings positioned around its circumference. The openings in the sequential laminations may be aligned so as to provide multiple oil ducts that axially traverse the stator 200. To elaborate, the openings may be cutouts in the laminations which align to form the axially extending oil ducts 230, 232 through at least a portion of the stator.

FIGS. 3 and 4 specifically show the cutouts 310 in the stator laminations 202. The cutouts may be formed by punching, stamping, drilling, or the like. The cutouts may, in some cases, be polygonal (e.g., rectangular, square, and the like), although other shapes, such as round or oval shapes, have been contemplated. In some examples, adjacent stator laminations may have openings with a different shape or position, or may be similarly formed and positioned within the stator stack in a rotationally offset manner, so that the variation in shape and/or position creates a baffled layout within the oil ducts 230, 232. For instance, adjacent laminations in the lamination stack may be formed with similarly shaped and sized cutouts, with the position of the cutouts alternating between a radially inward location and a radially outward location to form the baffled channel layout.

Using baffles in the oil ducts may also increase turbulence in the oil flow which may further increase the amount of heat transferred from the stator to the oil. However, other cutout arrangements that provide a generally baffled layout which forms a serpentine flow path through the oil ducts have been envisioned. For instance, the oil channels may be formed by a first set of sequential lamination cutouts that are positioned radial inward from a second set of sequential lamination cutouts. More generally, the cutouts in the stator laminations may be profiled and arranged to realize a desired baffled duct layout that may satisfy different stator and inverter power module cooling demands. The increased cooling capabilities realized with the selected duct layout may reduce the likelihood of degradation of inverter power module and stator components. Thus, the electric machine may achieve greater space efficiency than systems using separate cooling systems for spatially separated inverter power packs and electric motors.

In one example, the cutouts may be formed in the stator laminations 202 towards an outer periphery thereof and may be circumferentially distributed around the lamination stack in the stator. More specifically, as illustrated in FIGS. 3 and 4, the cutouts 310 may be formed at a location radially inward from an outer surface 316 of the stator laminations and radially outward from the teeth 201 of the stator. Further, as previously described, the cutouts 310 in each stator lamination may vary in shape and/or size.

Even further, each of the cutouts 310 in sequential stator laminations that are at least partially aligned to form one of the oil ducts may have a different geometry from an adjacent cutout forming the oil duct. For example, in some cases, the cutouts 310 in sections of the stator laminations proximal to an inverter power module (e.g., near outer section 320 of the stator laminations 202) may be shaped differently than cutouts formed in areas along the circumference of the stator where inverter power modules are not mounted. For instance, the cutouts 310 in the outer section 320 (as well as outer sections 334, 336) of the stator laminations may be formed to have a larger area compared to cutouts formed in other outer sections. In this way, a larger flow of oil may be realized through the oil ducts formed by the cutouts in the outer sections near the inverter power modules, which may increase heat transfer between the oil and the inverter power modules for enhanced cooling thereof. In one example, the cutouts 310 in the outer sections near the inverter power modules may further include geometries creating a baffled layout in the oil ducts 230, 232 in these sections, in the manner described above, where the increased turbulence in the oil flow near the inverter power modules may further increase cooling capabilities of the system, thereby reducing the chances of component degradation (e.g., in the inverter power modules) and increasing system and component performance and longevity.

Thus, in some examples, referring collectively again to FIGS. 2-4, the oil ducts 230, 232 may be formed in outer portions of each of the stator laminations 202 (e.g., peripheral sections radially outward from teeth 201). For instance, the oil ducts 230, 232 may extend in opposing axial directions from a radial opening 231 formed by the stator laminations. The radial opening 231 may be formed in a central portion of the stator laminations 202. To construct the radial opening 231, a portion of the stator laminations, which are centrally located, may have a smaller diameter than the outer laminations. In this way, the radial opening 231 may be efficiently formed (by altering the size of the selected stator laminations as desired) to provide a compact design for routing oil received in the radial opening toward both of the axially extending oil ducts 230, 232.

Further, the radial opening 231 shown in FIG. 2 may be included in (and/or in fluid communication with) a recessed oil inlet 331 formed in the stator 200, as illustrated in FIG. 3. The recessed oil inlet may be formed in a central portion of the stator laminations corresponding to the position of the radial opening 231 formed in the stator laminations (e.g., between a first axial end 312 and a second axial end 314 of the stator, as shown in FIG. 3).

Similar to the radial opening formed in the stator laminations, the recessed oil inlet 331 may be efficiently formed by altering (e.g., reducing) the size of selected stator laminations as desired to provide an oil flow path about a circumference of the stator. Thus, the recessed oil inlet 331 may be at least partially bounded by the central portion of stator laminations 202 (e.g., on a radially inward side of the circumferential recessed oil inlet), and may be in fluid communication with the oil ducts 230, 232 formed in the stator laminations on either axial side of the central portion of the stator laminations. Further, an outer periphery of the recessed oil inlet 331 may be at least partially bound by a bottom surface of the inverter power modules 302, 304, 306 (e.g., the bottom surface 322 of the inverter power module 306), as illustrated in FIG. 3.

The outer periphery of the recessed oil inlet 331 may be further bound by an inner surface of the housing 110, when the stator and inverter power module assembly 300 is assembled within the housing 110. For instance, in one example, the housing 110 include an inner surface (e.g., an inner surface 256 of the housing portion 214 shown in FIG. 2) that is contoured to have a profile corresponding to the peripheral profile of the stator and inverter power module assembly 300, such that the assembly 300 can be fixed and enclosed within the housing 110 in a press-fit configuration. In this way, the inner surface 256 of the housing portion 214 may extend around and/or contact with the outer surface of the stator 200 (e.g., at locations other than the outer sections 334, 336, 320 shown in FIGS. 3-4) and the outer surfaces of the inverter power modules 302, 304, 306, when the assembly 300 is inserted within the housing 110. As such, oil flowing into and through the recessed oil inlet 331 formed in the manner described herein may flow beneath the inverter power modules, providing increased heat transfer capabilities between the oil and the inverter modules in the region of the recessed oil inlet.

Thus, with continued reference to FIG. 3, the recessed oil inlet 331 may generally form a trough, at least partially circumferentially surrounding the stator, for receiving oil (e.g., via the oil inlet 120 and radial opening 231 shown in FIG. 2) and directing oil in opposing axial directions to the plurality of oil ducts 230, 232 formed through the stator laminations 202. Thus, oil may flow into the recessed oil inlet 331 and then flow towards opposing first and second axial ends 312, 314 via the oil ducts 230, 232, respectively. In this way, due to the positioning of the cutouts in the stator laminations (e.g., radially outward from the teeth 201), oil flowing from the recessed oil inlet through the oil ducts may continue to remove heat from the stator and inverter power modules mounted to the peripheral surface of the stator 200.

In order to provide oil to the radial opening 231 in the stator laminations 202 (and thus to the recessed oil inlet 331 and the oil ducts 230, 232), the oil inlet 120 may be mounted to the housing 110 in fluidic communication with the radial opening 231 and thus the recessed oil inlet 331. Turning specifically to FIG. 2, a bore 240 (e.g., radially aligned bore) of the oil inlet 120 is aligned and in fluid communication with the radial opening 231. The bore 240 therefore may extend through the housing portion 214.

In some cases, since the radial opening 231 may be formed in a central portion of the stator laminations 202 (e.g., at an axial midpoint of the stator), the oil inlet 120 may be correspondingly mounted to the housing. For instance, the oil inlet 120 may be mounted to the housing so as to be positioned proximate a midpoint of the stator 200. In this way, oil may be distributed through the oil ducts 230, 232 to provide for more balanced cooling across the stator laminations 202. In other examples, however, the oil inlet and radial opening may be spaced away from the stator's axial mid-point. In such an example, the radial opening 231 in the stator laminations 202 (and the recessed oil inlet 331, shown in FIG. 3) may be positioned accordingly to align with the bore 240 of the oil inlet 120.

The inverter power modules and the stator 200 will now be discussed with reference to FIGS. 3 and 4. The stator 200 is included in an assembly 300 that includes the stack of stator laminations 202 and the inverter power modules 302, 304, 306. It will be understood that the assembly 300 may be positioned within the housing 110 of the electric machine 100 depicted in FIGS. 1-2. Further, although three inverter power modules are illustrated, other numbers of modules have been contemplated, such as one module, two modules, six modules, etc., in different examples.

The inverter power modules 302, 304, 306 each form an interface with a peripheral surface of an outer section of the stack of stator laminations 202, as indicated at 303, 305, and 307, respectively. Therefore, heat from the modules may be directly conducted to the stator lamination stack, in one example. However, in another example, discussed in greater detail herein a thermal interface material may be positioned between the power modules and the laminations. Further, the interfaces 303, 305, and 307 may correspond to outer sections 334, 336 and 320, respectively, of the outer surface 316 of the stator laminations 202.

In the illustrated example, the outer sections 334, 336, and 320 may be spaced apart from each other along the circumference of the stator 200, such that the invert modules 302, 304, 306 are correspondingly spaced apart from one another. More specifically, a section 338 of the outer surface 316 of the stator laminations may be disposed between the outer sections 334, 336, and a section 340 of the outer surface may be disposed between the outer sections 336, 320. Further, a section 342 of the outer surface may separate the outer sections 334, 320 of the stator laminations. In one example, the section 342 of the outer surface 316 may be substantially larger than the sections 338, 340, such that the outer sections 334, 336, 320 which interface with the inverter power modules are generally grouped together on one side of the stator laminations. However, other arrangements of the outer sections of the stator laminations have been contemplated, in different examples.

In some examples, each of the inverter modules 302, 304, 306 may similarly arranged on (e.g., coupled to) the stator 200, such that each of the interfaces 303, 305, 307 may be substantially identical except for their respective distinct positions about a circumference of the stator laminations. In one example, each of the inverter modules may be similarly (e.g., identically) formed and structured, which may reduce costs and complexity associated with manufacturing and assembly of the inverter modules. However, other arrangements have been contemplated, in other examples, such as where one or more of the inverter power modules may constructed differently from another of the inverter modules. Such varying construction of the power modules may be desirable for different applications, and may depend on packaging constraints imposed by the housing 110 or the power demands of the inverter modules, for instance. For simplicity, the following description regarding the structure of the inverter power modules and interfaces may be directed more specifically towards the interface 307 between the inverter power module 306 and the stator laminations 202, though the discussion may apply to any and/or all of the inverter power modules and interfaces, in different examples.

The inverter module 306 forms the interface 307 with a peripheral surface 318 of an outer section 320 (e.g., a section of the outer surface 316) of the stack of stator laminations 202. To elaborate, in one example, the inverter module 306 may be generally rectangular and have a planar (e.g., flat) bottom surface 322 forming the interface 307 with the peripheral surface 318 of outer section 320 of the stator laminations 202, in some examples. As such, the stator laminations 202 may be formed so that the peripheral surface 318 is in face-sharing contact with the bottom surface 322 of the inverter module 306. Specifically, in one example, the peripheral surface 318 may be flat.

In some examples, the inverter module 306 may include an enclosure having the generally rectangular shape and planar bottom surface 322 described above. The enclosure may define a chamber designed to house components of the inverter module (e.g., electrical components, hardware, etc.). For instance, a printed circuit board (PCB) may be disposed within the enclosure of the inverter module 306. The PCB may be a generally flat rectangular board, in some examples, and the inverter module enclosure may be sized to accommodate the PCB, though various sizes and shapes have been envisioned. Thus, the inverter modules, and particularly the enclosures thereof, may be selectively and inexpensively structured (e.g., with a less complex design) to accommodate various inverter modules as desired for a given application, such that inverter power modules that are simple to manufacture may be efficiently incorporated into the system.

In other examples, however, the bottom surface 322 of the inverter module enclosure may have be a curved surface, at least partially corresponding to the profile of the outer section 320 (e.g., the peripheral surface 318) of the stator laminations 202 at the interface 307, in one example. Such a design may allow for a reduction in the size of the stator and inverter power module assembly, in some cases, though the curved structure of the enclosure may have increased complexity demanding more elaborate for positioning inverter module components (e.g., the PCB) within the enclosure. As such, the following discussion of the inverter power module structure 306 will be directed towards the exemplary enclosure design of inverter module 306 having the flat bottom surface 322 interfacing with the flat peripheral surface at the interface 307.

In order to provide the flat peripheral surface 318 at the interface 307, the stator laminations 202 may be formed so as to have a varying radius at the outer section 320 of the outer surface 316 of the stator laminations. For instance, as illustrated in FIG. 4, a radius 400 of the stator laminations 202 varies along the outer section 320 so as to form the flat peripheral surface 318. In one example, the radius 400 may generally be greater than a radius 402 at the sections 338, 340 and/or 342 of the outer surface 316 of the stator laminations 202 (e.g., where an inverter module is not positioned). In other words, the radius 402 at the outer sections 338, 340, 342 and/or at any other section of the outer surface 316 where an inverter module is not positioned may be substantially constant, while the radius 400 at outer section 320, and a radius of the stator laminations at sections 334, 336, may vary to form a flat peripheral surface at each of the interfaces 303, 305, 307. Thus, the flat peripheral surfaces may be efficiently formed by altering the shape of the stator laminations 202 as desired at selected sections (e.g., at outer section 320) of the outer surface 316 of the stator laminations to provide a flat interface to which an inverter power module may be coupled.

Referring again specifically to the interface 307, the inverter power module 306 may be mounted on the peripheral surface 318 of the stator laminations 202, in face-sharing contact therewith. As illustrated in FIG. 3, the inverter module 306 may have a length 350, measured in the direction of the y-axis, that is substantially equal to a length of the stack of stator laminations 202, as measured between first and second axial ends 312, 314 thereof, in one example, which may allow for simplified electrical connections between stator coils wound through the stator 200 and components of the inverter modules in a space-efficient manner. Further, the peripheral surface 318 of the outer section 320 also extends from the first axial end 312 to the second axial end 314, such that the peripheral surface 318 has a length substantially equal to the length 350. Even further, as illustrated in FIG. 4, the inverter module 306 and the peripheral surface 318 may have a width 406 that is substantially the same, in one example. As such, the entire bottom surface 322 of the inverter power module 306 may be in face-sharing contact with the peripheral surface 318 of the stator laminations 202, in some examples.

In other examples, the inverter power modules 302, 304, 306 may have a length that is less than the axial length of the stack of stator laminations 202, and the peripheral surface 318 may be formed in the outer section 320 of stator laminations along a length of the stack corresponding to the length of the inverter module. In such examples, the inverter module may be positioned along the stator laminations so as to extend from one of the axial ends 312, 314 such that axial ends of the inverter module are spaced away from both of the axial ends 312, 314. Nonetheless, the length 350 of the inverter power module 306 may be chosen so that the inverter power module 306 extends across the recessed oil inlet 331 (formed in the selected ones of the stator laminations 202) between the first and second axial ends 312, 314. In this way, the inverter module forms at least a portion of a boundary of the recessed oil inlet 331, as previously described, so that oil flowing into and through the recessed oil inlet may be in direct contact with the bottom surface 322 of the inverter module 306 to efficiently remove heat therefrom.

In one example, the inverter module 306 is positioned so as to span the recessed oil inlet 331 near a midpoint of the inverter module, particularly when the recessed oil inlet 331 is centrally located along the stack of stator laminations 202 and the inverter module is centrally positioned between the first and second axial ends 312, 314. In this way, as oil flows through the recessed oil inlet 331 and axially outwards through the oil ducts 230, 232, more balanced cooling may be realized along the entire length of the stator and the inverter power module.

Further, the peripheral surface 318 of the outer section 320 also extends from the first axial end 312 to the second axial end 314, such that the peripheral surface 318 has a length substantially equal to the length 350. Even further, as illustrated in FIG. 4, the inverter module 306 and the peripheral surface 318 may have a width 406 that is substantially the same, in one example. As such, the entire bottom surface 322 of the inverter power module 306 may be in face-sharing contact with the peripheral surface 318 of the stator laminations 202, in some examples.

Thus, when oil is received in the recessed oil inlet 331 (e.g., via the oil inlet 120 of the oil circuit 112 shown in FIGS. 1-2) and routed into the axially extending oil ducts 230, 232 in the stator laminations 202, heat may be transferred from the inverter power modules 302, 304, 306 to the oil. As previously described, the cutouts 310 forming the oil ducts 230, 232 may be positioned radially outward from the stator teeth 201, so as to be positioned nearer the outer surface 316 of the stator laminations than the stator teeth 201. In this way, the heat transfer between the inverter modules and the oil flowing through oil ducts 230, 232 may be increased for more efficient cooling of the inverter modules.

Further, in some examples, a thermal interface material (TIM) 319 may be disposed between the peripheral surfaces of the stator laminations 202 and the inverter modules, as particularly illustrated at the interface 307 between the peripheral surface 318 of the stator laminations and the bottom surface 322 of the inverter power module 306. In one example, the TIM may be a thermal paste. In other examples, the TIM may be thermally conductive epoxy or a silicone-based adhesive which may cure into a solid state. In still other examples, the TIM may be a thermal film (which may include a silicone or polyimide), thermal tape, phase change material, or other material or combination of materials that are capable of increasing the heat transfer between the bottom surface 322 of the inverter power module 306 and the peripheral surface 318 of the stator laminations 202. In this way, heat transfer capabilities at the interface may be further enhanced to more effectively remove heat from the inverter modules.

By using the oil flowing through the oil ducts 230, 232 to cool the inverter power modules 302, 304, 306, the cooling system of an electric machine (e.g., cooling system 102 for the electric machine 100 shown in FIG. 1) efficiently utilizes an oil circuit to remove heat from the stator 200 and the inverter power modules 302, 304, 306 due to their arrangement in a common housing (e.g., housing 110 shown in FIGS. 1-2). Further, the baffled layout of the oil ducts 230, 232, as previously described, may further enhance cooling of the inverter modules effected by oil flowing through the oil ducts.

Even further, the cooling system may be compactly arranged with an electric motor (e.g., in an electric drive unit) for simultaneously cooling inverter power modules and the motor, thereby reducing the overall weight and cost of the system (e.g., by omitting a separate cooling plate for the inverter modules). Additionally, with the stator 200 and inverter modules 302, 304, 306 incorporated into the assembly 300 depicted in FIGS. 3 and 4 (and assembled into the housing 110 shown in FIGS. 1 and 2), some oil received in the recessed inlet 331 and/or flowing from the oil ducts 230, 232 in the stator laminations 202 may leak into contact with the inverter power modules. However, as the oil is a dielectric fluid, the oil may come into contact with the inverter modules without leading to issues with the function or life span of the inverter modules, if wanted in some examples.

In some examples, referring again to FIG. 2, heat may additionally be transferred from the oil ducts 230, 232, through an outer portion 233 of the laminations 202, to the wall 221 of the housing 110. At least a portion of the peripheral surface of the laminations may therefore be in face sharing contact with at least a portion of an inner surface of the housing.

FIGS. 1-4 provide for a cooling system operating method. The method includes flowing oil through a plurality of oil ducts that axially extend through a stack of stator laminations. In said method, the stack of stator laminations includes a peripheral surface extending along an axial length of the stack. Further, the stack includes a plurality of cutouts in sequential stator laminations that form the plurality of oil ducts. Even further, an inverter power module is coupled to the peripheral surface. Even further, the peripheral surface may have a varying radius at a section to which the inverter power module is coupled, such that the section of the peripheral surface coupled to the inverter module is flat. More specifically, flowing the oil through the plurality of oil ducts may include operating a pump to flow oil through an oil inlet that extends through a housing. In one particular example, the oil inlet may be in fluid communication with the plurality of oil ducts via a recessed inlet formed at an axial mid-point of the stack of stator laminations. The method further includes thermally conducting heat from the stator laminations and the inverter power module to the oil flowing through the oil ducts. In one example, at least a portion of the plurality of cutouts are located radially outward from teeth in the stator laminations. In this way, heat may be efficiently transferred from the inverter power module to the oil (e.g., via the peripheral surface), and a space-efficient cooling system for removing heat produced in the stator and the inverter power module may be realized. Further, in certain examples, the peripheral surface may be further enhanced by providing a TIM between the inverter power module and the peripheral surface, as previously discussed.

The technical effect of the cooling system operating method described herein is to efficiently and jointly transfer heat from one or more inverter power modules and a stator enclosed in a housing of an electric machine to oil flowing through a plurality of oil ducts axially extending through laminations of the stator. Consequently, a desired amount of electric machine cooling can be achieved in a space efficient package with a common cooling system, thereby increasing motor efficiency.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, an electric machine is provided that comprises a stator including a stack of stator laminations, each of the stator laminations having a plurality of cutouts that form a plurality of oil ducts which axially extend through the stack of stator laminations; and an inverter power module forming an interface with a peripheral surface of an outer section of the stack of stator laminations; wherein the stator and the inverter power module are positioned within a housing.

In another aspect, a method for an electric motor cooling system is provided that comprises: flowing oil through a plurality of oil ducts that axially extend through a stack of stator laminations; wherein the stack of stator laminations includes a peripheral surface extending along an axial length of the stack and a plurality of cutouts in sequential stator laminations form the plurality of oil ducts; and wherein an inverter power module is coupled to the peripheral surface. In one example, flowing oil through the plurality of oil ducts may include operating a pump to flow oil through an oil inlet that extends through the housing. In another example, the method may further comprise thermally conducting heat from the stator laminations and the inverter power module to the oil, wherein at least a portion of the plurality of cutouts are located radially outward from teeth in the stator laminations.

In yet another aspect, a cooling system for an electric motor is provided that comprises a stator including a stack of stator laminations that include a recessed inlet which at least partially circumferentially extends around the stack and receives oil from an oil inlet and directs oil to a plurality of oil ducts; wherein the plurality of oil ducts axially extend through at least a portion of the stack of stator laminations; and wherein at least a portion of the plurality of oil ducts are positioned radially inward from a first inverter power pack coupled to the stack; and a housing enclosing the stator and the first inverter power pack.

In any of the aspects of combinations of the aspects, the interface may include a thermal interface material arranged between the peripheral surface and the inverter power module.

In any of the aspects of combinations of the aspects, the thermal interface material may be a thermal paste.

In any of the aspects of combinations of the aspects, the outer section of the stack of stator laminations that forms the interface may include a flat surface.

In any of the aspects of combinations of the aspects, the inverter power module may be in face-sharing contact with the peripheral surface of the stack of stator laminations.

In any of the aspects of combinations of the aspects, the outer section of the stack of stator laminations may have a varying radius.

In any of the aspects of combinations of the aspects, the electric machine may further comprise an oil inlet extending through the housing, wherein the stack of stator laminations may include a recessed inlet that circumferentially extends around at least a portion of the stack and is designed to receive oil from the oil inlet and direct the oil to the plurality of oil ducts.

In any of the aspects of combinations of the aspects, the inverter power module may axially extend across the recessed inlet.

In any of the aspects of combinations of the aspects, the plurality of oil ducts may include at least two ducts that extend from the recessed inlet in opposing axial directions.

In any of the aspects of combinations of the aspects, the oil inlet may be in fluid communication with the plurality of oil ducts via a recessed inlet formed at an axial mid-point of the stack of stator laminations.

In any of the aspects of combinations of the aspects, the peripheral surface may have a varying radius at a section coupled to the inverter power module.

In any of the aspects of combinations of the aspects, the section of the peripheral surface coupled to the inverter power module may be flat.

In any of the aspects of combinations of the aspects, a thermal interface material may be arranged between the peripheral surface and the inverter power module.

In any of the aspects of combinations of the aspects, the recessed inlet may be located between first and second axial ends of the stack, and the first inverter power pack may extend between the first and second axial ends across the recessed inlet.

In any of the aspects of combinations of the aspects, the first inverter power pack may be coupled to a first peripheral surface section of the stator laminations, and a second inverter power pack may be coupled to a second peripheral surface section of the stator laminations.

In any of the aspects of combinations of the aspects, the first and second peripheral surface sections may have radii greater than a radius of outer sections of the stack between the first and second peripheral surface sections.

Note that the example control and estimation routines included herein can be used with various electric machine and/or vehicle system configurations. The control methods and routines disclosed herein may be stored as executable instructions in non-transitory memory and may be carried out by the control system including the controller in combination with the various sensors, actuators, and other vehicle system and/or electric machine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various electric machine hardware components in combination with the electronic controller.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine comprising:
a stator including a stack of stator laminations, each of the stator laminations having a plurality of cutouts that form a plurality of oil ducts which axially extend through the stack of stator laminations;
an inverter power module forming an interface with a peripheral surface of an outer section of the stack of stator laminations;
wherein the stator and the inverter power module are positioned within a housing; and
an oil inlet extending through the housing, wherein the stack of stator laminations includes a recessed inlet that circumferentially extends around at least a portion of the stack and is designed to receive oil from the oil inlet and direct the oil to the plurality of oil ducts;
wherein the inverter power module extends axially across the recessed inlet.

2. The electric machine of claim 1, wherein the interface includes a thermal interface material arranged between the peripheral surface and the inverter power module.

3. The electric machine of claim 2, wherein the thermal interface material is a thermal paste.

4. The electric machine of claim 1, wherein the outer section of the stack of stator laminations that forms the interface includes a flat surface.

5. The electric machine of claim 1, wherein the inverter power module is in face-sharing contact with the peripheral surface of the stack at the interface.

6. The electric machine of claim 5, wherein the outer section of the stack of stator laminations has a varying radius.

7. The electric machine of claim 1, wherein the plurality of oil ducts include at least two ducts that extend from the recessed inlet in opposing axial directions.

8. A method for an electric motor cooling system, comprising:
flowing oil through a plurality of oil ducts that axially extend through a stack of stator laminations;
wherein the stack of stator laminations includes a peripheral surface extending along an axial length of the stack, and wherein a plurality of cutouts in sequential stator laminations form each of the plurality of oil ducts; and
wherein an inverter power module is coupled to the peripheral surface of the stack of stator laminations, the inverter power module radially overlapping multiple circumferentially adjacent oil ducts of the plurality of oil ducts.

9. The method of claim 8, wherein flowing oil through the plurality of oil ducts includes operating a pump to flow oil through an oil inlet that extends through a housing.

10. The method of claim 9, wherein the oil inlet is in fluid communication with the plurality of oil ducts via a recessed inlet formed at an axial mid-point of the stack of stator laminations.

11. The method of claim 8, wherein the peripheral surface has a varying radius at a section coupled to the inverter power module.

12. The method of claim 11, wherein the section of the peripheral surface coupled to the inverter power module is flat.

13. The method of claim 8, further comprising thermally conducting heat from the stator laminations and the inverter power module to the oil, wherein at least a portion of the plurality of cutouts are located radially outward from teeth in the stator laminations.

14. The method of claim 8, wherein a thermal interface material is arranged between the peripheral surface and the inverter power module.

15. A cooling system for an electric motor, comprising:
a stator including a stack of stator laminations that include a recessed inlet which at least partially circumferentially extends around the stack and receives oil from an oil inlet and directs oil to a plurality of oil ducts;
wherein the plurality of oil ducts axially extend through at least a portion of the stack of stator laminations;
wherein at least a portion of the plurality of oil ducts are positioned radially inward from a first inverter power pack coupled to the stack; and
a housing enclosing the stator and the first inverter power pack;
wherein the recessed inlet is located between first and second axial ends of the stack, and the first inverter power pack extends between the first and second axial ends across the recessed inlet.

16. The cooling system of claim 15, wherein the first inverter power pack is coupled to a first peripheral surface section of the stator laminations, and a second inverter power pack is coupled to a second peripheral surface section of the stator laminations.

17. The cooling system of claim 16, wherein the first and second peripheral surface sections have radii greater than a radius of outer sections of the stack between the first and second peripheral surface sections.

* * * * *